US010368024B2

(12) United States Patent
Hirai

(10) Patent No.: US 10,368,024 B2
(45) Date of Patent: *Jul. 30, 2019

(54) SOLID-STATE IMAGE SENSOR CAPABLE OF RESTRICTING DIGITAL SIGNAL PROCESSING OPERATION DURING TIME SENSITIVE AND HEAVY LOAD PERIODS, METHOD OF CONTROLLING THE SAME, ELECTRONIC DEVICE, AND STORAGE MEDIUM

(71) Applicant: CANON KABUSHIKI KAISHA, Tokyo (JP)

(72) Inventor: Yuichi Hirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/484,335

(22) Filed: Apr. 11, 2017

(65) Prior Publication Data

US 2017/0223296 A1 Aug. 3, 2017

Related U.S. Application Data

(63) Continuation of application No. 14/679,422, filed on Apr. 6, 2015, now Pat. No. 9,654,715.

(30) Foreign Application Priority Data

Apr. 10, 2014 (JP) .................................. 2014-081439

(51) Int. Cl.
*H04N 5/335* (2011.01)
*H04N 5/378* (2011.01)
*H04N 5/376* (2011.01)

(52) U.S. Cl.
CPC ........... *H04N 5/378* (2013.01); *H04N 5/3765* (2013.01)

(58) Field of Classification Search
CPC ............................. H04N 5/378; H04N 5/3765
(Continued)

(56) References Cited

U.S. PATENT DOCUMENTS 6,636,999 B1 * 10/2003 Yamada .................... G06F 1/12
326/93
2004/0051795 A1 * 3/2004 Ajioka ............... G06K 9/00234
348/239
(Continued)

FOREIGN PATENT DOCUMENTS

JP H11-041522 A 2/1999
JP 2003-087639 A 3/2003
(Continued)

OTHER PUBLICATIONS

Japanese Office Action, which is enclosed without an English Translation, that issued in Japanese Patent Application No. 2014081439.

*Primary Examiner* — Usman A Khan
(74) *Attorney, Agent, or Firm* — Cowan, Liebowitz & Latman, P.C.

(57) ABSTRACT

A stacked-type solid-state image sensor including a first semiconductor layer in which an imaging pixel portion is implemented, and a second semiconductor layer in which a digital signal processing unit is implemented, comprises a first timing control unit configured to generate a drive timing signal of the imaging pixel portion, an A/D converter configured to convert an analog signal output from each pixel of the imaging pixel portion into a digital signal, a second timing control unit configured to generate a drive timing signal of the A/D converter; and a status generation unit configured to receive an event signal generated by at least one of the first timing control unit and the second timing control unit and generate a status signal to restrict an operation of the digital signal processing unit.

10 Claims, 13 Drawing Sheets

(58) Field of Classification Search
USPC .......................................................... 348/308
See application file for complete search history.

(56) References Cited

U.S. PATENT DOCUMENTS

| | | | | |
|---|---|---|---|---|
| 2009/0295959 | A1* | 12/2009 | Shoho | H04N 5/35554 348/294 |
| 2010/0045835 | A1* | 2/2010 | Matsunaga | H01L 27/14627 348/308 |
| 2012/0105696 | A1* | 5/2012 | Maeda | H01L 21/76898 348/302 |
| 2013/0068929 | A1* | 3/2013 | Solhusvik | H01L 27/14634 250/208.1 |
| 2013/0334436 | A1* | 12/2013 | Yamada | H04N 5/32 250/394 |

FOREIGN PATENT DOCUMENTS

| | | |
|---|---|---|
| JP | 2003-153070 A | 5/2003 |
| JP | 2007-096633 A | 4/2007 |
| WO | 2014/007004 A1 | 1/2014 |

* cited by examiner

F I G. 6
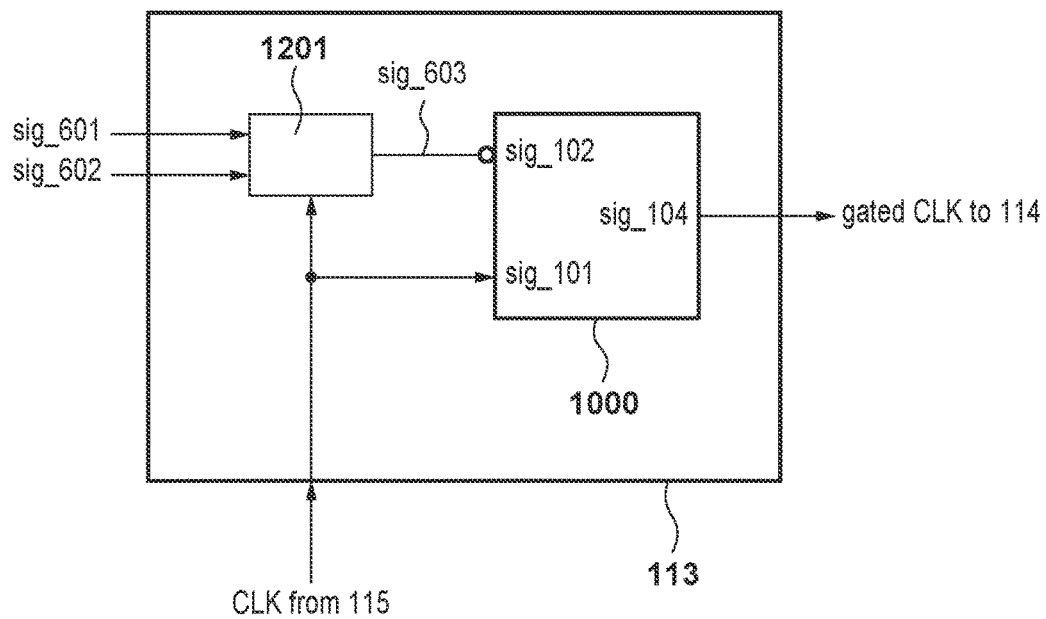

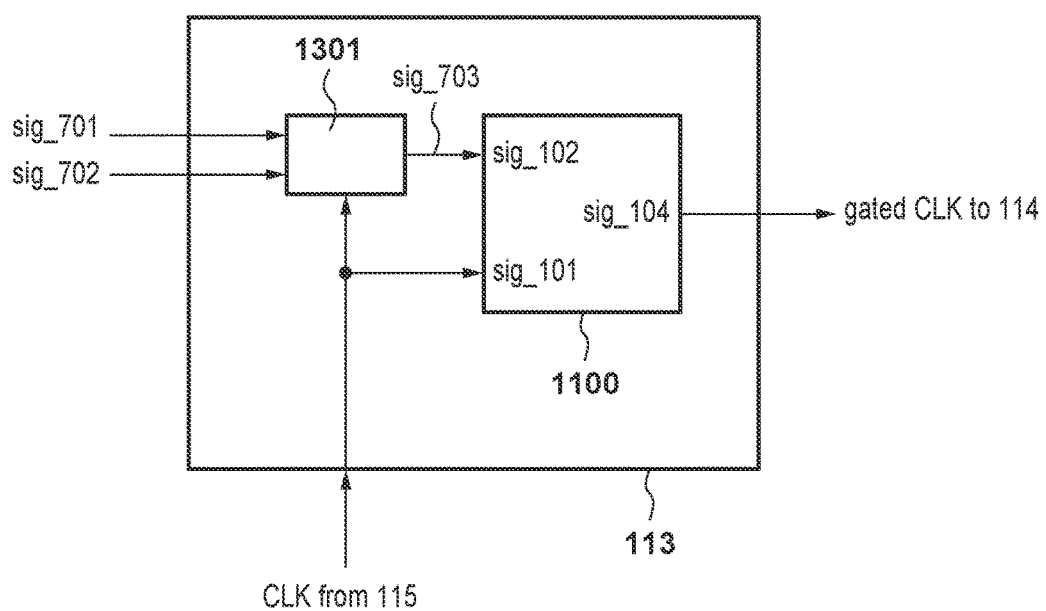
F I G. 11

SOLID-STATE IMAGE SENSOR CAPABLE OF RESTRICTING DIGITAL SIGNAL PROCESSING OPERATION DURING TIME SENSITIVE AND HEAVY LOAD PERIODS, METHOD OF CONTROLLING THE SAME, ELECTRONIC DEVICE, AND STORAGE MEDIUM

CROSS-REFERENCE TO RELATED APPLICATION

This application is a continuation of application Ser. No. 14/679,422, filed Apr. 6, 2015, the entire disclosure of which is hereby incorporated by reference.

BACKGROUND OF THE INVENTION

Field of the Invention

The present invention relates to a solid-state image sensor and an electronic device including the same.

Description of the Related Art

There has recently been devised a device such as an image sensor in which an analog signal processing unit and a digital signal processing unit including a logic, a memory, and the like are embedded in one chip. For example, an analog signal processing unit and a digital signal processing unit are formed in different semiconductor layers and stacked in the wafer level or chip level, thereby forming a one-chip device without loss of integration in each layer.

FIG. 13 is a block diagram showing the main part of a conventional image sensor 80 such as a CMOS image sensor. Drive control to acquire a pixel signal is performed by a drive timing generation unit 81. Upon receiving a drive signal from the drive timing generation unit 81, charges are photoelectrically converted in a pixel array 82 and acquired as a potential. The voltage signal obtained from the pixel array 82 is digitized by an A/D conversion unit 84. The A/D conversion unit 84 is controlled by an A/D conversion unit control unit 83.

FIG. 14 is a block diagram showing the main part of an image sensor having a stacked structure and illustrating assignment to each semiconductor layer in a case where the analog signal processing unit and the digital signal processing unit of the image sensor shown in FIG. 13 are stacked. Referring to FIG. 14, a first semiconductor layer 90 is a layer including an analog signal processing unit, and a second semiconductor layer 96 is a layer including a digital signal processing unit.

Blocks 91, 92, 93, and 94 shown in FIG. 14 are equivalent to the blocks 81, 82, 83, and 84 shown in FIG. 13, respectively. In this example, however, the A/D conversion unit 94 and the control unit 93 are mounted on the side of the second semiconductor layer 96. In addition, a logic and a memory implemented as digital elements on the side of the second semiconductor layer 96 are implemented in a block 95 shown in FIG. 14.

The first semiconductor layer 90 and the second semiconductor layer 96 shown in FIG. 14 are stacked, as described above. When the semiconductor layers come close to each other, an electromagnetic wave or heat generated by the operations of the layers has an influence. To solve this problem, in Japanese Patent Laid-Open No. 2012-94720, a metal layer is formed in a region except a region where a through electrode is formed between stacked layers, and a function as a shield layer is imparted.

To connect signals of different semiconductor layers, a stable common potential (ground: to be referred to as GND hereinafter) needs to be set. However, the impedance between GNDs cannot be neglected in local GND connection. For this reason, a potential is formed between the GNDs of the layers and dynamically fluctuates in every operation wherein a current flows.

When a synchronization circuit design that operates based on a specific clock is employed on the digital layer side, the state of a status holding element (flip-flop circuit: to be referred to as an FF element hereinafter) is switched in synchronism with each edge (leading/trailing) of the clock. Hence, an enormous number of FF elements simultaneously consume the current. A current to be consumed by a combination logic (a combination circuit formed from an AND element/OR element and the like) connected to the output of the FF element also flows at the same timing.

The current consumption at the same timing on the digital layer side raises the potential of the digital-side GND and affects as an apparent power supply fluctuation. As a result, when A/D-converting a signal potential from the above-described stacked analog signal processing unit and acquiring a digital signal, the acquired potential of the analog signal or a reference potential used by the A/D converter fluctuates. This finally leads to periodic noise caused by digital signal processing and degrades image quality.

SUMMARY OF THE INVENTION

The present invention has been made in consideration of the above-described problems, and suppress image quality degradation caused by noise in an image sensor constructed by stacking an analog signal processing unit and a digital signal processing unit.

According to the first aspect of the present invention, there is provided a stacked-type solid-state image sensor including a first semiconductor layer in which an imaging pixel portion including a plurality of pixels arranged in a matrix is implemented, and a second semiconductor layer in which a digital signal processing unit is implemented, comprising: a first timing control unit configured to generate a drive timing signal of the imaging pixel portion; an A/D converter configured to convert an analog signal output from each pixel of the imaging pixel portion into a digital signal; a second timing control unit configured to generate a drive timing signal of the A/D converter; and a status generation unit configured to receive an event signal generated by at least one of the first timing control unit and the second timing control unit and generate a status signal to restrict an operation of the digital signal processing unit.

According to the second aspect of the present invention, there is provided a method of controlling a stacked-type solid-state image sensor including a first semiconductor layer in which an imaging pixel portion including a plurality of pixels arranged in a matrix is implemented, and a second semiconductor layer in which a digital signal processing unit is implemented, comprising: a first timing control step of generating a drive timing signal of the imaging pixel portion; an A/D conversion step of converting an analog signal output from each pixel of the imaging pixel portion into a digital signal; a second timing control step of generating a drive timing signal in the A/D conversion step; and a status generation step of receiving an event signal generated in at least one of the first timing control step and the second timing control step and generating a status signal to restrict an operation of the digital signal processing unit.

Further features of the present invention will become apparent from the following description of exemplary embodiments with reference to the attached drawings.

BRIEF DESCRIPTION OF THE DRAWINGS

FIG. 6 is a block diagram showing the arrangement of a clock supply unit;

FIG. 11 is a block diagram showing the arrangement of a clock supply unit according to the second embodiment;

DESCRIPTION OF THE EMBODIMENTS

The embodiments of the present invention will now be described in detail with reference to the accompanying drawings.

First Embodiment

Figure 1:
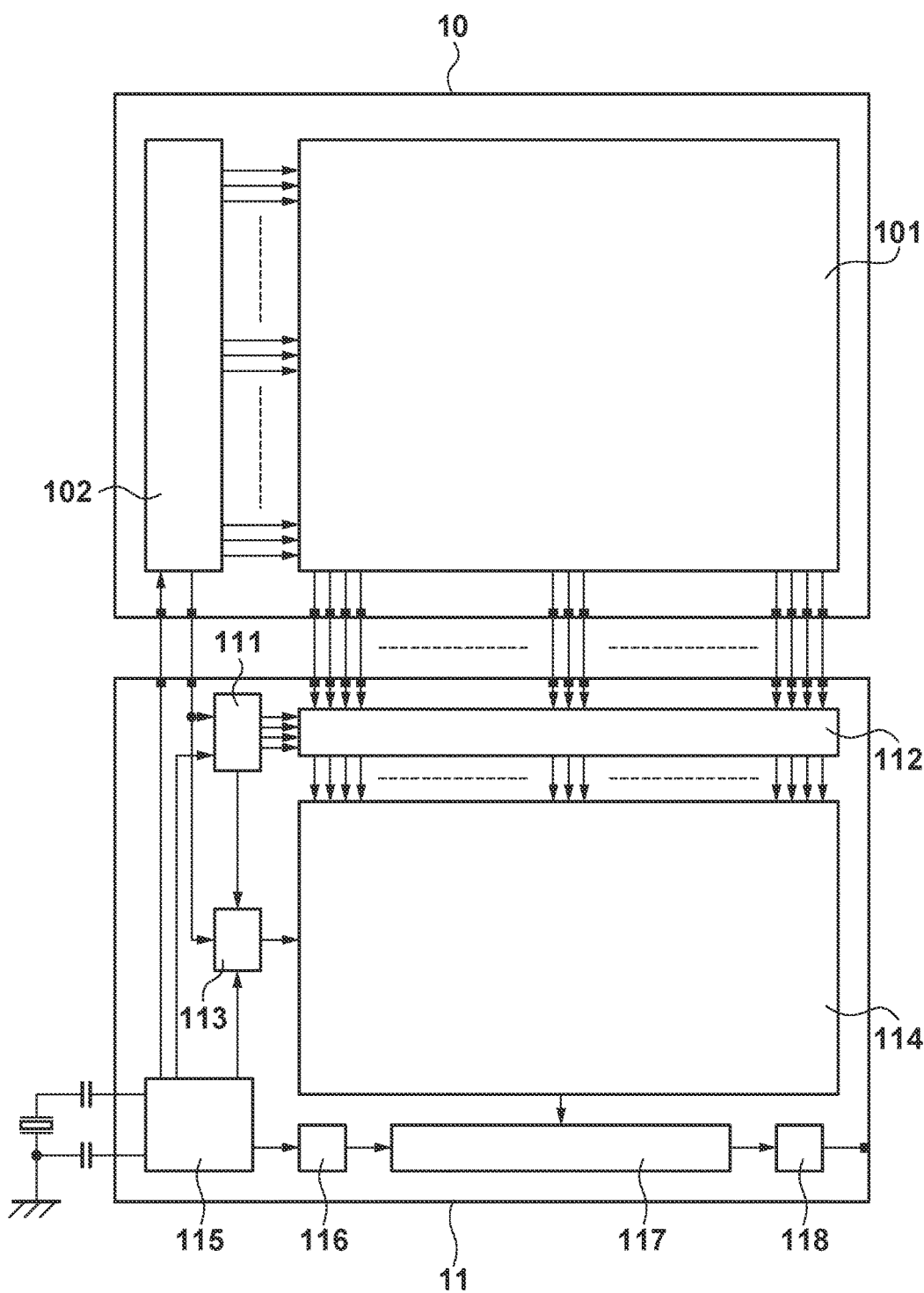
FIG. 1 is a block diagram showing the arrangement of an image sensor according to an embodiment of the present invention.

This embodiment is directed to the structure of a solid-state image sensor. An semiconductor element that implements the image sensor according to this embodiment has a stacked structure of a first semiconductor layer in which an analog signal processing unit such as an imaging pixel portion is implemented and a second semiconductor layer in which a digital signal processing unit is implemented. FIG. 1 is a block diagram showing the arrangement of the image sensor according to this embodiment. An imaging pixel portion 101 is implemented in a first semiconductor layer 10, and a digital signal processing unit 114 is implemented in the second semiconductor layer 11.

Referring to FIG. 1, a plurality of pixels each including a photoelectric conversion portion and a plurality of transistors are two-dimensionally arrayed in the imaging pixel portion 101. A drive control unit 102 implemented in the first semiconductor layer 10 together with the imaging pixel portion 101 is a circuit configured to drive the imaging pixel portion 101. In this embodiment, operation control (clock masking processing) of the digital signal processing unit resulting from the operations of imaging pixel portion drive signals (signals sig_301, sig_302, and sig_303 shown in FIG. 3 to be described later) handled by the drive control unit 102 will be described.

In addition to the digital signal processing unit 114, a drive control unit 111, an A/D conversion unit 112, a clock supply unit 113, a clock generation unit 115, a drive control unit 116, a buffer 117, and a driver element 118 are implemented in the second semiconductor layer 11. The A/D conversion unit 112 converts an analog signal output from each pixel of the imaging pixel portion 101 into a digital signal. The drive control unit 111 drives the A/D conversion unit 112. Note that the A/D conversion unit 112 is provided in correspondence with each column of the imaging pixel portion 101.

The digital signal processing unit 114 includes a logic circuit and an SRAM that are characteristic parts in the second semiconductor layer. Examples of the logic in the image sensor are correction (shading correction, defective pixel correction, and the like) of errors caused by the imaging pixel portion 101, processing of a digital signal as image information, and I/F processing of transferring data to the device of the subsequent stage as a system using the image sensor. However, the processes are not concerned with the characteristic parts of this embodiment, and a detailed description thereof will be omitted. The second semiconductor layer 11 is also provided with the buffer 117 used to adjust the timing of transfer data as part of I/F processing of transferring data to the device of the subsequent stage, and the driver element 118 assigned a physical layer. They are not characteristic components, and a description thereof will be omitted.

The digital signal processing unit 114 shown in FIG. 1 according to this embodiment is implemented as a logic circuit using a status holding FF element, as described above. This logic circuit implements common mode transfer using a reference clock, and is implemented as a generally known synchronization circuit. The reference clock is supplied from the clock supply unit 113 to the logic circuit unit. A clock gating circuit 1000 shown in FIG. 5 (to be described later) is implemented in the clock supply unit 113.

A clock as the base of the clock supply unit 113 is supplied from the clock generation unit 115. The clock generation unit 115 obtains a desired frequency by multiplying/dividing a master clock via an oscillation unit. In many cases, a PLL (Phase Locked Loop) circuit is used to adjust the phase. The clock generation unit 115 supplies the clock to the digital signal processing unit 114 via the clock supply unit 113. The clock generation unit 115 also supplies the clock to the drive control unit 102 (timing control unit) that controls a drive timing signal, the drive control unit 111 of the A/D conversion unit 112, and the drive control unit 116 of the buffer 117. The clock rate is adjusted to a frequency suitable to each process by the multiplication/division processing of the clock generation unit 115.

Figure 2:
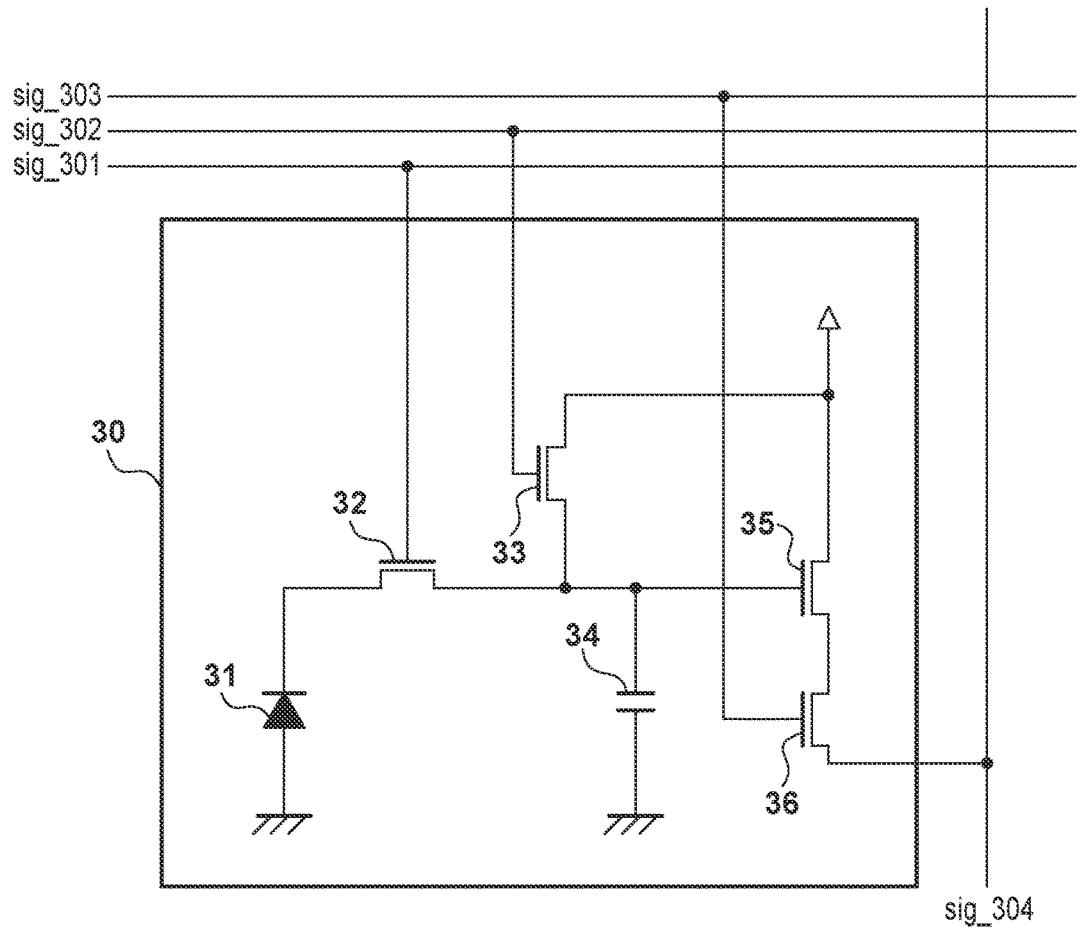
FIG. 2 is a circuit diagram showing the structure of a unit pixel of an imaging unit.

FIG. 2 is a circuit diagram showing a unit pixel of the imaging pixel portion. Referring to FIG. 2, a block 30 indicates the circuit arrangement of one pixel in the imaging pixel portion 101. A photodiode (to be referred to as a PD hereinafter) 31 is a photoelectric conversion portion. Charges acquired by the PD 31 are temporarily accumulated in an FD (Floating Diffusion) unit 34 serving as a signal accumulation portion. The FD unit 34 is shielded from light on the semiconductor and configured not to change the held charges even upon receiving light.

A transfer transistor 32 serves as a transfer gate that transfers the charges accumulated in the PD 31 to the FD unit 34, and is controlled by the transfer signal sig_301. A reset transistor 33 is a transistor configured to reset the PD 31 and the FD unit 34, and is controlled by the reset signal sig_302. An amplification transistor 35 is an amplifier that amplifies a signal. A select transistor 36 serving as a signal readout unit outputs the signal amplified by the amplification transistor 35 as a signal sig_304 of a vertical signal line. The select transistor 36 is controlled by the selection signal sig_303.

Figure 3:
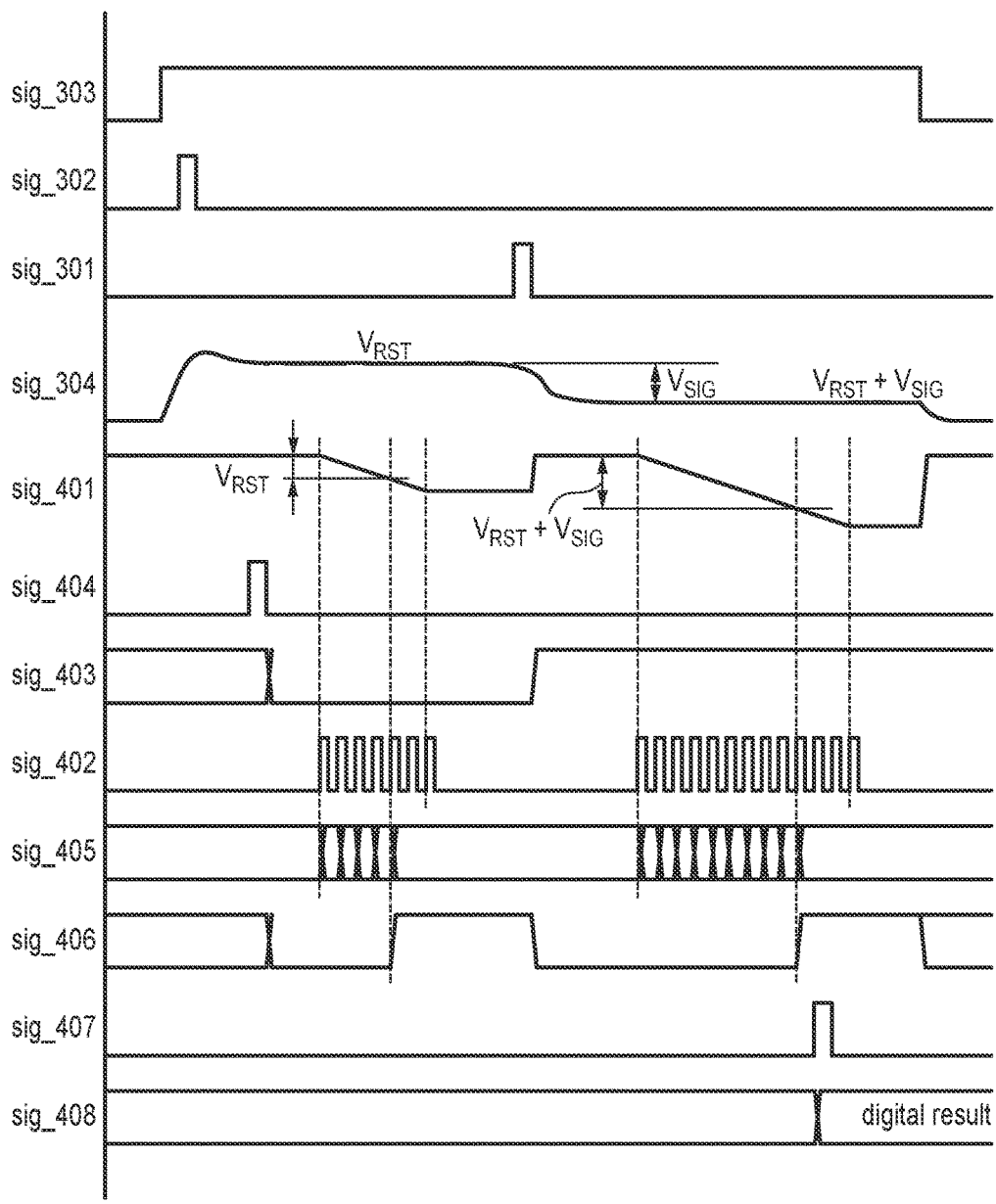
FIG. 3 is a timing chart of main signals of the imaging unit and an A/D conversion unit.

FIG. 3 is a timing chart of main signals of the imaging pixel portion and the A/D conversion unit. The signals sig_301 to sig_304 will be explained in this embodiment, and remaining signals sig_401 to sig_408 will be described in the second embodiment. When the signal sig_303 is in the selected state (here, in high state or during the selection period), the output state of the amplification transistor 35 appears in the signal sig_304 via the select transistor 36. At this time, when the signal sig_302 is controlled to turn on the reset transistor 33, the state of the signal sig_304 changes to a reset potential (VRST in FIG. 3) during the reset instruction period. After the elapse of the accumulation time (exposure) after the reset operation (not shown), the signal sig_301 is controlled to turn on the transfer transistor 32 (transfer instruction period by a charge transfer signal), thereby transferring charges to the FD unit 34. The photoelectric conversion result value is output to the signal sig_304 as a voltage via the amplification transistor 35 and the select transistor 36. The potential of the signal sig_304 changes as much as the result value (VSIG in FIG. 3).

In this embodiment, the semiconductor element of the image sensor is defined as a stacked type. Considering that the signal sig_304 is transferred for A/D conversion from the first layer that performs analog signal processing to the second layer that performs digital signal processing, the operation on the digital signal processing side is suppressed during the fluctuation period of the signal sig_304, thereby suppressing periodic noise.

Figure 4:
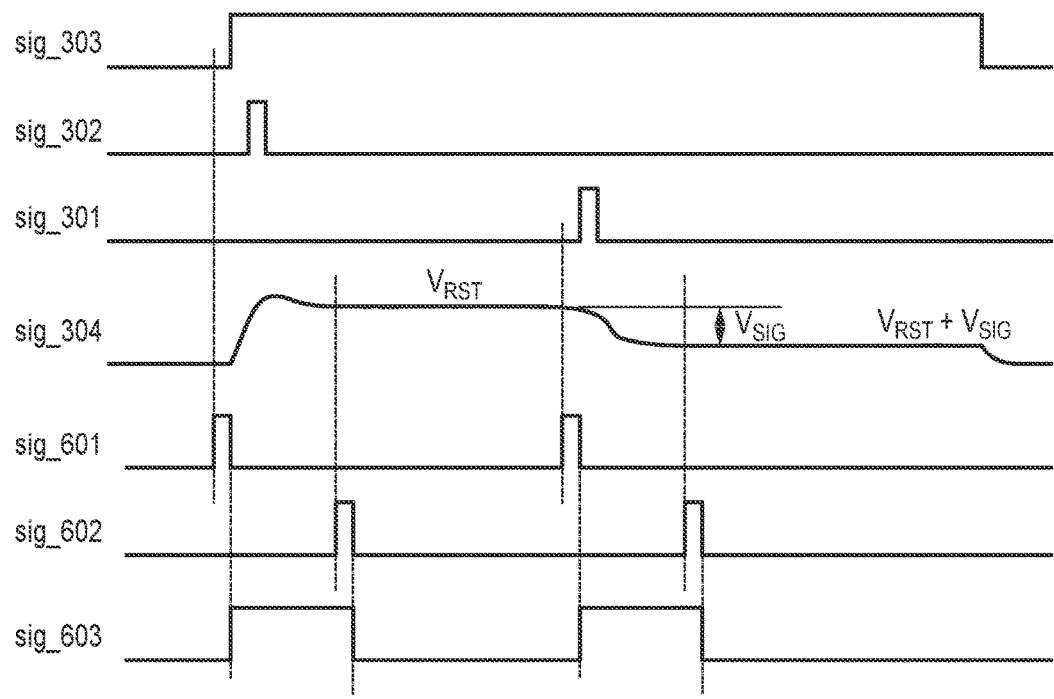
FIG. 4 is a timing chart of a clock gating status.

FIG. 4 is a timing chart of a clock gating status according to this embodiment. The signals sig_301 to sig_304 in FIG. 4 are equivalent to the signals sig_301 to sig_304 in FIG. 3, and a description thereof will be omitted. Referring to FIG. 4, a signal sig_603 is a status signal representing the operation of the clock gating status. The state is defined such that the synchronization clock signal of the digital signal processing unit 114 is masked by a masking signal in the high state, but not masked in the low state.

In this embodiment, a clock gating status signal sig_603 is generated so as to mask the clock edges of the clock signal of the digital signal processing unit intermittently or during a predetermined period before and after the potential fluctuation of the output signal sig_304 before and after the reset signal sig_302 and the transfer signal sig_301 in the selected state of the selection signal sig_303.

A signal sig_601 in FIG. 4 is an event signal for high state transition of the status signal sig_603, and a signal sig_602 is an event signal for low state transition of the status signal sig_603. When a scan timing is generated in the drive control unit 102 shown in FIG. 1, the event is similarly generated and transferred to the clock supply unit 113. The clock supply unit 113 includes an FF element 1201 that changes/holds the state to the high state upon receiving the event of the signal sig_601 or to the low state upon receiving the event of the signal sig_602, as shown in FIG. 6 to be described later.

The drive control unit 102 shown in FIG. 1 transmits the same signals as the signals sig_301 to sig_303 to the pixels of each line in every control in the vertical direction. The signal sig_601 or sig_602 is transferred to the clock supply unit 113 in FIG. 1 as, for example, a signal that merges the events for each line (by OR logic or the like) in the drive control unit 102.

Figure 5:
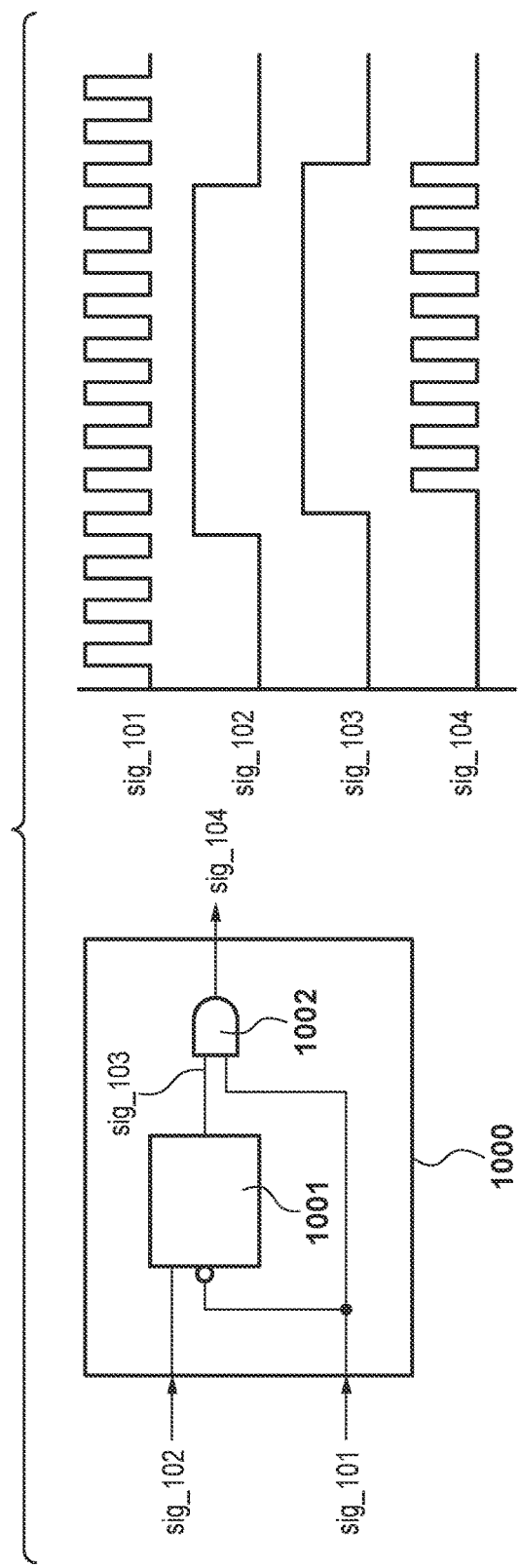
FIG. 5 is a view showing an example of a clock gating circuit.

FIG. 5 is a view showing an example of a clock gating circuit according to this embodiment. Referring to FIG. 5, the clock gating circuit 1000 generates a gated clock signal. A latch circuit 1001 in the clock gating circuit 1000 passes the state of a signal sig_102 to a signal sig_103 during the low state of a signal sig_101, or holds the immediately preceding state of the signal sig_103 in the high state of the signal sig_101. The signal sig_101 serves as the clock signal, and the signal sig_102 serves as an enable signal (enabled in the high state). At this time, the output from the latch circuit 1001 and the clock signal sig_101 are input to an AND circuit 1002, thereby obtaining a signal sig_104 in which clock pulses appear only during the high state of the enable signal sig_102.

When a signal obtained by inverting the logic of the status signal sig_603 in FIG. 4 is used as the input to the signal sig_102 in FIG. 5, a gated clock signal is obtained in which the clock pulses stop at a timing when the signal sig_304 changes to the potential VRST or VRST+VSIG. When the clock gating circuit 1000 is implemented in the clock supply unit 113 in this way, the clock signal supplied to the digital signal processing unit 114 can appropriately be controlled.

FIG. 6 is a block diagram showing the clock supply unit 113 which supplies the clock signal to the logic circuit and in which the clock gating circuit 1000 is implemented. Referring to FIG. 6, the FF element 1201 changes/holds the state upon receiving the event of the event signal sig_601 or sig_602, as described above. The FF element 1201 outputs the status signal sig_603 to restrict the digital signal processing operation. The status signal sig_603 masks, as needed, the clock signal supplied to the digital signal processing unit 114 via the clock gating circuit 1000 of the subsequent stage.

The system is designed such that the clock frequency of the digital signal processing unit 114 becomes much higher than the clock signal for operation control of the drive control unit 102 of the imaging pixel portion 101. This can avoid a failure in system establishment caused by insertion of the clock masking period in the digital signal processing unit 114.

Second Embodiment

In the first embodiment, operation control (clock masking processing) of the digital signal processing unit resulting from the operations of imaging pixel portion drive signals (signals sig_301, sig_302, and sig_303 shown in FIG. 3 described above) handled by the drive control unit 102 in FIG. 1 has been described. In this embodiment, operation control (clock masking processing) of a digital signal processing unit resulting from the operations of A/D conversion unit drive signals (signals sig_402 to sig_404 shown in FIG. 3) handled by a drive control unit 111 of an A/D conversion unit 112 in FIG. 1 will be described.

Figure 7:
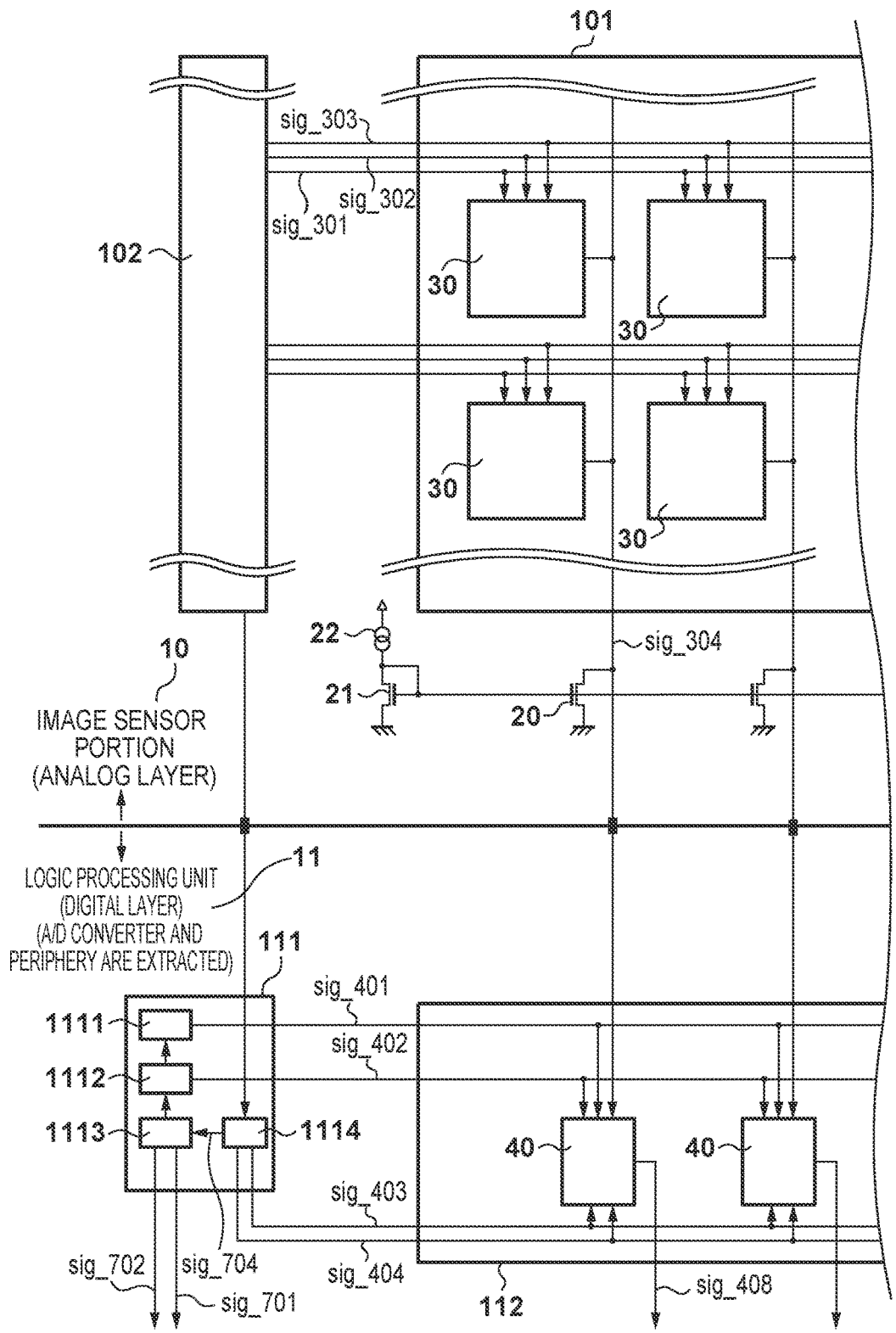
FIG. 7 is a block diagram showing the relationship between an imaging unit and an A/D conversion unit.

FIG. 7 is a block diagram showing the relationship between an imaging pixel portion and the A/D conversion unit. The relationship between an imaging pixel portion 101 and a drive control unit 102 in a first semiconductor layer 10 in which the imaging pixel portion 101 is implemented is the same as in the first embodiment. Unit pixels 30 shown in FIG. 2 are two-dimensionally arrayed in the imaging pixel portion 101 in the horizontal and vertical directions. The drive control unit 102 supplies common drive signals sig_301, sig_302, and sig_303 to an arbitrary horizontal array of the imaging pixel portion 101. Every time the vertical position changes, independent drive signals (same drive signals as the signals sig_301 to sig_303) are supplied to each line.

Each of the unit pixels 30 outputs the signal from a select transistor 36 to a vertical signal line (corresponding to a signal sig_304). In this embodiment, the signal sig_304 (and the vertical signal lines in the horizontal direction) is transferred at the boundary between the first semiconductor layer 10 in which the imaging pixel portion 101 is implemented and a second semiconductor layer 11 in which a digital signal processing unit is implemented.

In the first semiconductor layer 10 shown in FIG. 7 in which the imaging pixel portion is implemented, a current mirror circuit formed from transistors 20 and 21 and a constant current source 22 is implemented so as to supply a current to the vertical signal line of each column. When the select transistor 36 in the unit pixel 30 shown in FIG. 2 is turned on by the selection signal sig_303, an amplification transistor 35 is source-follower-connected to the vertical signal line. Then, an output (like the signal sig_304 shown in FIG. 3) corresponding to the pixel signal appears in the vertical signal line.

Figure 8:
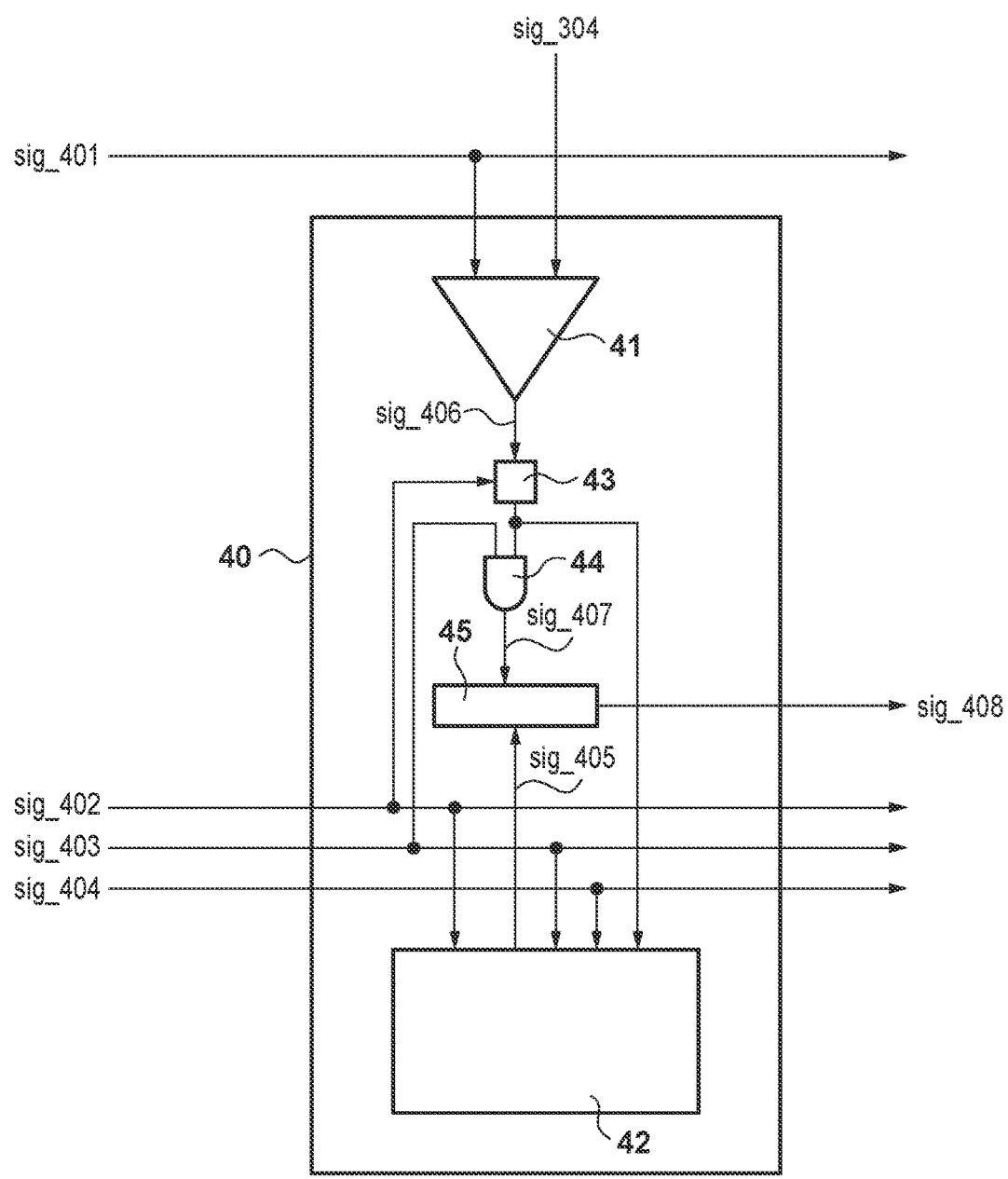
FIG. 8 is a block diagram showing the A/D conversion unit for each pixel unit.

In this embodiment, the A/D conversion unit 112 shown in FIG. 7 includes a plurality of A/D converters 40 provided on a column basis. FIG. 8 is a block diagram showing the detailed arrangement of the A/D converter 40 provided on a column basis. As shown in FIG. 8, the A/D converter 40 of each column receives the analog signal sig_304 output from each unit pixel, a reference signal sig_401, a count clock signal sig_402, a count direction status signal sig_403, and a reset signal sig_404, and outputs a result signal sig_408.

A comparator 41 compares the analog signal sig_304 with the reference signal sig_401. For example, if the potential of the analog signal sig_304 is higher than that of the reference signal sig_401, the comparator 41 outputs a high state. A counter 42 executes a count operation in the up (or down) direction during clock input. A differential circuit 43 extracts a change in the signal output from the comparator 41. An AND element 44 masks the output from the differential circuit 43 by a status. A register 45 stores/holds the value of the counter 42 in accordance with the event of the output of the differential circuit 43 masked by the AND element 44.

Referring to FIG. 7, the drive control unit 111 of the A/D conversion unit 112 includes a reference signal output unit 1111 that outputs, to the A/D conversion unit 112, the reference signal sig_401 to be input to the comparator 41. The drive control unit 111 also includes a control signal generation unit 1114 that generates and outputs the count direction status signal sig_403 and the reset signal sig_404 to the A/D conversion unit 112 upon receiving the event signal from the drive control unit 102 of the imaging pixel portion 101.

Referring to FIG. 7, the control signal generation unit 1114 receives the event signals of the transfer signal sig_301 and the reset signal sig_302 from the drive control unit 102 in the first semiconductor layer 10 in which the imaging pixel portion 101 is implemented. In this case, the event signals correspond to events in an arbitrary line selected by the selection signal sig_303. The control signal generation unit 1114 outputs, to the A/D conversion unit 112, the count direction status signal sig_403 representing the count direction (up/down) of the counter 42 in the A/D converter 40 and the reset signal sig_404 of the counter 42. The control signal generation unit 1114 also outputs, to a reference generation control unit 1113, a lamp status signal sig_704 that instructs generation of a lamp signal.

The reset signal sig_404 initializes the count value of the counter 42 to 0. The count direction status signal sig_403 changes to the low state when counting the state of a potential VRST after a reset transistor 33 is turned on, and changes to the high state when counting the state of a potential (VRST+VSIG) after a transfer transistor 32 is turned on. The counter 42 is decremented in the low state of the count direction status signal sig_403 and incremented in the high state.

Referring to FIG. 7, the reference generation control unit 1113 receives the lamp status signal sig_704 from the control signal generation unit 1114, recognizes whether the current A/D conversion target is the VRST count or (VRST+VSIG) count, and holds the processing status. The reference generation control unit 1113 also outputs event signals sig_701 and sig_702 shown in FIG. 9 (to be described later) to a clock supply unit 113. The reference generation control unit 1113 transmits the processing status to a reference generation count unit 1112.

Upon receiving the processing status from the reference generation control unit 1113, the reference generation count unit 1112 outputs, to the A/D converters 40, the count clock signal sig_402 of the counter 42 during VRST count period and the (VRST+VSIG) count period. The reference generation count unit 1112 also includes a counter (not shown) that executes lamp down count in synchronism with the event of the count clock signal sig_402.

Figure 9:
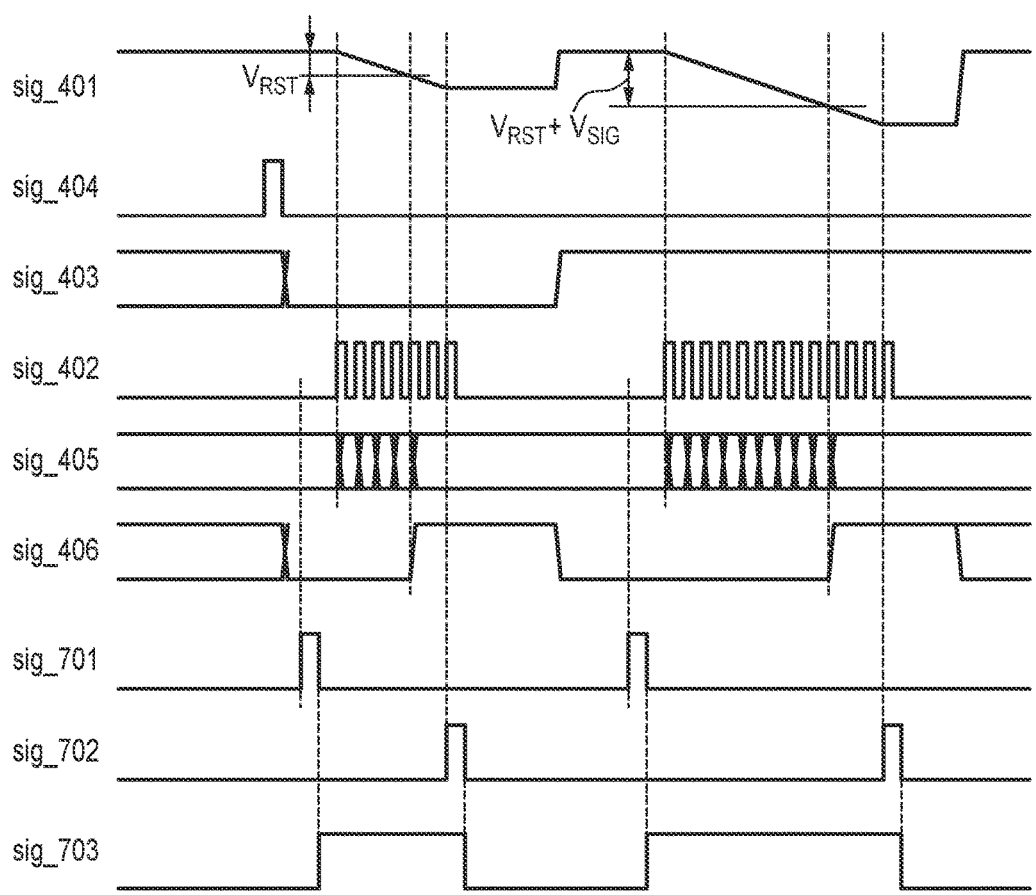
FIG. 9 is a timing chart of a clock gating status.

The count clock signal sig_402 is sent during a period in which the counter 42 can sufficiently perform count and comparison of the pixel output signal sig_304 and the reference signal sig_401 during the VRST count period and the (VRST+VSIG) count period. For example, if the target A/D conversion has a size of 12 bits, a count range of 4,096 is necessary. However, the period can be shortened because the full range is not necessary for the VRST count period. FIGS. 3 and 9 roughly illustrate the count clock signal sig_402. Actually, this signal exists at a higher resolution. More specifically, FIGS. 3 and 9 show only several to a dozen or so counts. However, the actual count range is as described above. This also applies to a signal sig_405.

The reference signal output unit 1111 shown in FIG. 7 includes a D/A converter, and therefore converts the count result from the reference generation count unit 1112 into an analog signal and outputs it as the reference signal sig_401.

The control signal generation unit 1114 shown in FIG. 7 transmits the reset signal sig_404 and the count direction status signal sig_403 to the A/D converters 40. Each A/D converter 40 receives a reset request (defined as the high state of the reset signal sig_404 in FIG. 3) by the reset signal sig_404 and resets the count value of the counter 42 to 0. The count direction status signal sig_403 at this time is in the low state, and the counter 42 here counts in the decrement direction (in the high state, the counter 42 counts in the increment direction). For this reason, the count state of the counter 42 according to this embodiment also handles a negative value as needed.

After sending the reset signal sig_404, the control signal generation unit 1114 sends the lamp status signal sig_704 to the reference generation control unit 1113 as an event signal to request the start of the A/D conversion operation. Upon receiving the lamp status signal, the reference generation control unit 1113 starts control to perform the A/D conversion operation of the potential VRST in the signal sig_304 (or a vertical signal line at an arbitrary horizontal position equivalent to the signal sig_304). The operation control period in which the A/D conversion operation of the potential VRST is performed is defined as step S0.

During the period of step S0, the reference generation count unit 1112 shown in FIG. 7 sends the count clock signal sig_402 to the A/D converters 40. At the same time, an operation of decrementing (or incrementing in reverse use) the lamp level is performed during the progress period of the count clock signal sig_402. During the sending period of the count clock signal sig_402, it is unnecessary to cover the full range of the A/D converter resolution (detecting the black level suffices), as described above, and the cover range can be narrowed by the set value of the register or the like. The clock serving as the master clock of the count clock signal sig_402 is distributed from a clock generation unit 115 shown in FIG. 1.

During the period of step S0, the counter 42 in the A/D converter 40 counts down from the initial value. When a comparison output signal sig_406 of the comparator 41 in the A/D converter 40 is inverted, the differential circuit 43 sends an event signal to the counter 42, thereby stopping the down-count operation. After completion of sending of the count clock signal sig_402 during a predetermined period (the reset operation period of the image sensor and the reference scan period determined by the resolution of the A/D converter) and lamp level transition of the reference signal sig_401, the reference generation count unit 1112 maintains the stop states of the reference signal sig_401 and the count clock signal sig_402.

Upon receiving the transfer signal sig_301 from the drive control unit 102 shown in FIG. 7, the control signal generation unit 1114 controls to change the count direction status signal sig_403 to the high state such that the counter 42 in the A/D converter 40 performs the increment operation. At this time, the reference generation control unit 1113 receives a state change of the lamp status signal sig_704 from the control signal generation unit 1114, and initializes the lamp level of the reference signal. After that, the reference generation control unit 1113 starts control to perform the A/D conversion operation of the potential (VRST+VSIG) in the signal sig_304 (or a vertical signal line at an arbitrary horizontal position equivalent to the signal sig_304). The operation control period in which the A/D conversion operation of the potential (VRST+VSIG) is performed is defined as step S1.

During the period of step S1, the reference generation count unit 1112 sends the count clock signal sig_402 to the A/D converters 40 as in step S0. At the same time, an operation of decrementing (or incrementing in reverse use) the lamp level is performed during the progress period of the count clock signal sig_402. The sending period of the count clock signal sig_402 at this time needs to cover the full range of the resolution of the A/D converter, unlike step S0.

During the period of step S1, the counter 42 in the A/D converter 40 counts up from the count state stopped in step S0, and finally obtains a count value corresponding to the value of the potential (VRST+VSIG). In this case as well, when the state of the comparison output signal sig_406 of the comparator 41 in the A/D converter 40 is inverted, the differential circuit 43 sends an event signal to the counter 42, thereby stopping the up-count operation. After completion of sending of the count clock signal sig_402 during a predetermined period and lamp level transition of the reference signal sig_401, the reference generation count unit 1112 maintains the stop states of the reference signal sig_401 and the count clock signal sig_402, as in the period of step S0.

During the operation period of step S1, an AND logic between the event signal of the differential circuit 43 and the state of the count direction status signal sig_403 holds, and the register 45 holds the current value of the counter 42 as the count value corresponding to the final value of the potential (VRST+VSIG). The register holding value is transferred to a digital signal processing unit 114 shown in FIG. 1 as the result signal sig_408, and undergoes digital signal processing.

FIG. 9 is a timing chart of a clock gating status according to this embodiment. The signals sig_401 to sig_406 in FIG. 9 are equivalent to the signals sig_401 to sig_406 in FIG. 3. The reference generation control unit 1113 shown in FIG. 7 generates the events of the event signals sig_701 and sig_702, as shown in FIG. 9, in each of the periods of steps S0 and S1. A signal sig_703 is defined to change to the high state in accordance with the event of the event signal sig_701 and to change to the low state in accordance with the event of the event signal sig_702.

According to this embodiment, in step S0, the event of the event signal sig_701 shown in FIG. 9 is defined to occur after the event of the reset signal sig_404 before the start of driving of the count clock signal sig_402. In addition, the event of the event signal sig_702 is defined to occur when the sending period of the count clock signal sig_402 is completed. Similarly, in step S1, the event of the event signal sig_701 is defined to occur after the state change of the count direction status signal sig_403 before the start of driving of the count clock signal sig_402.

When a signal obtained by inverting the logic of the status signal sig_703 in FIG. 9 is used as the input to a signal sig_102 in FIG. 5, a gated clock signal is obtained in which the clock stops at a timing during the lamp output enabled period of the reference signal sig_401 to the A/D converter 40. When a clock gating circuit is implemented in the clock supply unit 113 in this way, the clock supplied to the digital signal processing unit 114 can appropriately be controlled.

The system is designed such that the clock frequency of the digital signal processing unit 114 becomes much higher than the count clock signal sig_402 to the A/D converter 40. This can avoid a failure in system establishment caused by insertion of the clock masking period in the digital signal processing unit 114. However, if the clock stop period (for example, the period in which the signal sig_703 shown in FIG. 9 is high) is long, a restriction is imposed on the operation clock setting on the digital circuit side to establish the system.

Figure 10:
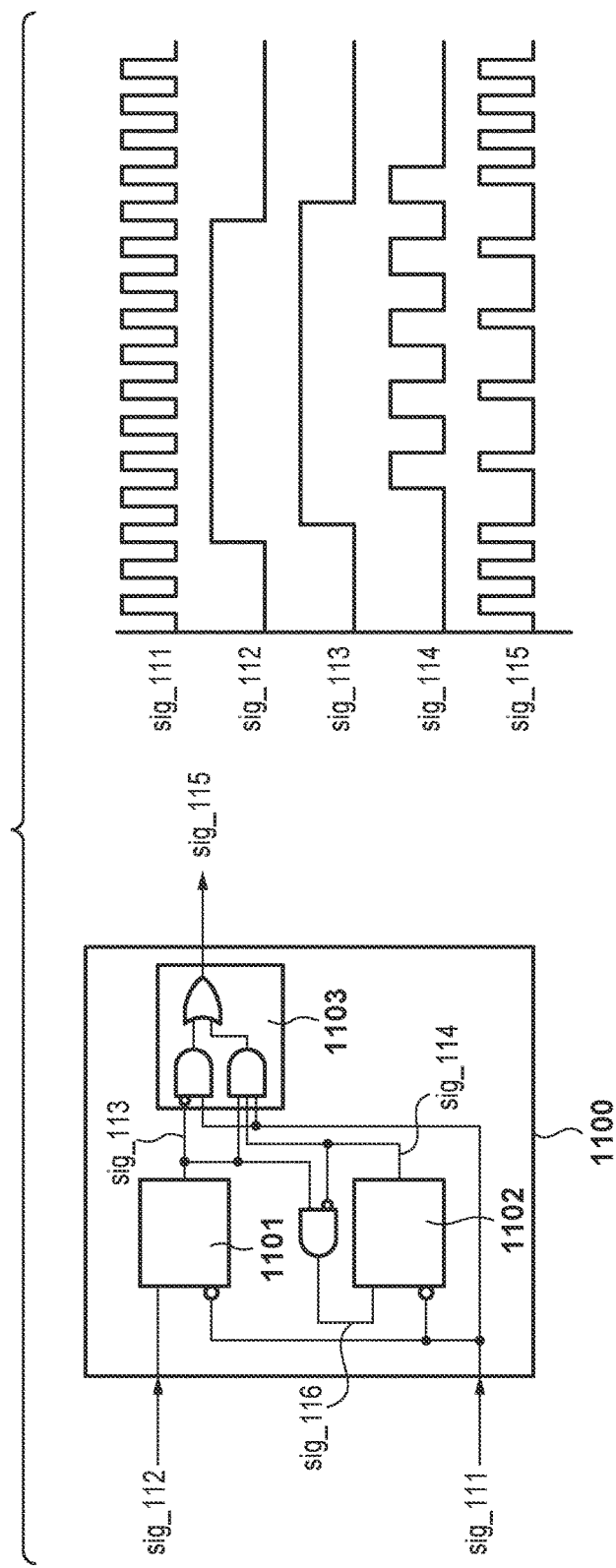
FIG. 10 is a view showing another example of the clock gating circuit.

FIG. 10 shows an example of a clock gating circuit that controls to divide the period instead of stopping the clock supplied to the digital signal processing unit 114 in the above-described gated clock acquisition period. Referring to FIG. 10, a clock gating circuit 1100 incorporates a frequency divider. Latch circuits 1101 and 1102 are provided in the clock gating circuit 1100. The latch circuit 1101 passes the state of a signal sig_112 to a signal sig_113 during the low state of a signal sig_111, or holds the immediately preceding state of the signal sig_113 in the high state of the signal sig_111. Similarly, the latch circuit 1102 passes the state of a signal sig_116 to a signal sig_114 during the low state of the signal sig_111, or holds the immediately preceding state of the signal sig_114 in the high state of the signal sig_111.

Referring to FIG. 10, a selector circuit 1103 switches between outputting a clock at the original period and outputting a clock at a divided clock period. The clock gating circuit is implemented in the clock supply unit 113 shown in FIG. 1, and the signal sig_111 is used as the drive clock of the digital signal processing unit 114 from the clock generation unit 115 shown in FIG. 1. The signal sig_703 shown in FIG. 9 is used as the input to the signal sig_112, thereby lowering the frequency of the drive clock of the digital signal processing unit 114 during the operation period of the reference signal sig_401 to the A/D converter 40.

FIG. 11 is a block diagram showing the clock supply unit 113 to the logic circuit in which the clock gating circuit 1100 is implemented. Referring to FIG. 11, an FF element 1301 serving as a status generation unit changes/holds the state upon receiving the event of the above-described signal sig_701 or sig_702. The FF element 1301 outputs the status signal sig_703 to restrict the digital signal processing operation. The status signal sig_703 masks, as needed, the clock supplied to the digital signal processing unit 114 via the clock gating circuit 1100 of the subsequent stage.

Third Embodiment

Figure 12:
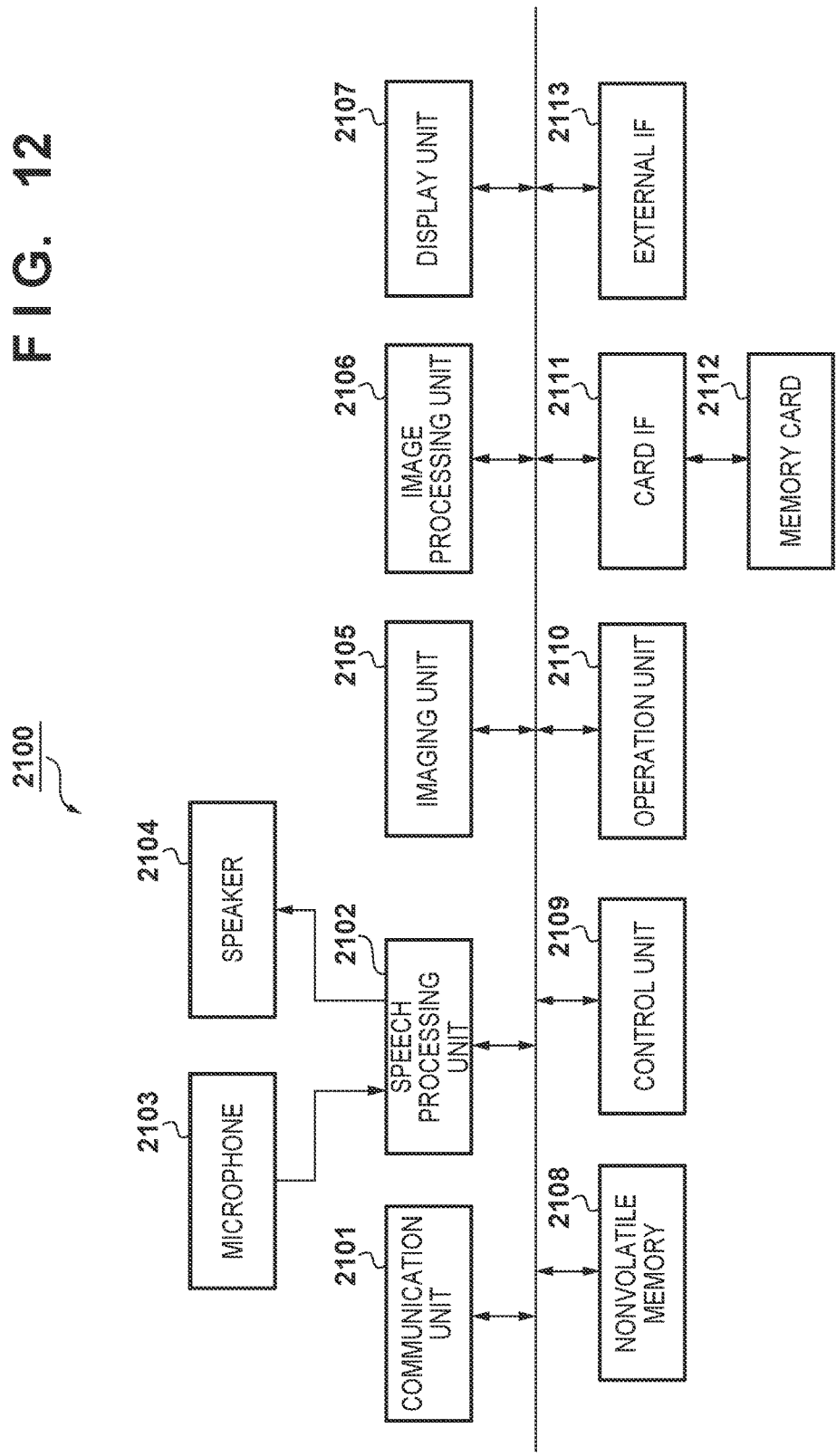
FIG. 12 is a block diagram showing the arrangement of a portable telephone according to the third embodiment.
Figure 13:
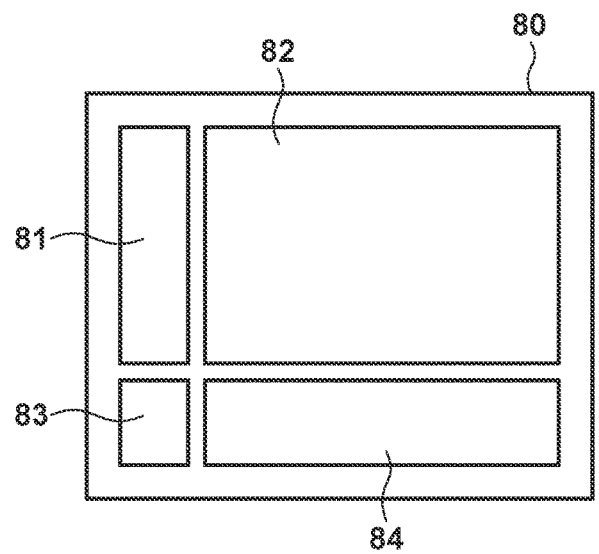
FIG. 13 is a block diagram showing the main part of a conventional image sensor.
Figure 14:
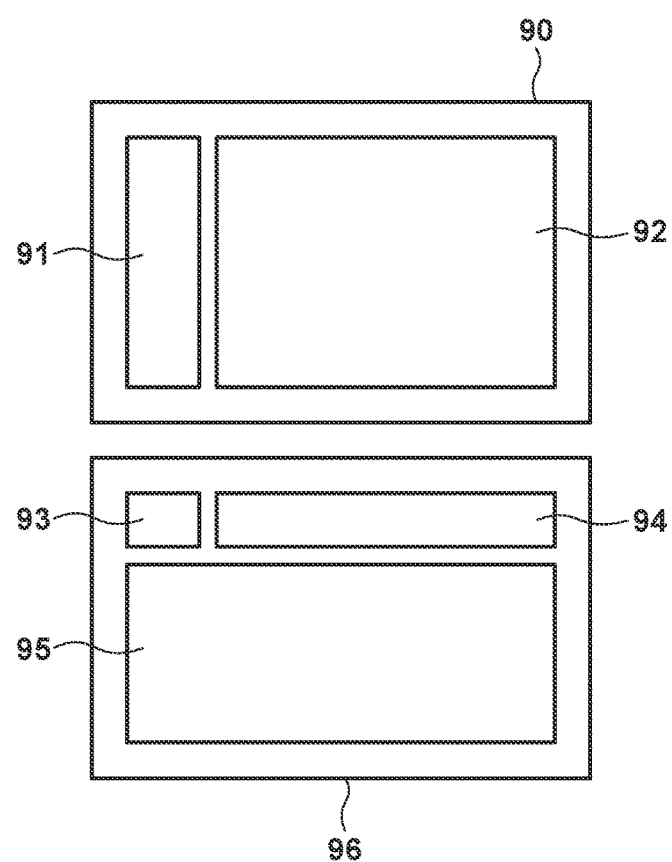
FIG. 14 is a block diagram showing the main part of an image sensor having a stacked structure.

FIG. 12 is a block diagram showing the arrangement of a portable telephone 2100 (electronic device) according to the third embodiment of the present invention. The portable telephone 2100 according to this embodiment has not only a speech communication function but also an email function, Internet connection function, image shooting and reproduction function, and the like.

Referring to FIG. 12, a communication unit 2101 communicates speech data or image data to another telephone using a communication method complying with the communication carrier to which the user has subscribed. In speech communication, a speech processing unit 2102 converts speech data from a microphone 2103 into a format suitable for a call and sends it to the communication unit 2101. The speech processing unit 2102 also decodes speech data of the communication partner sent from the communication unit 2101 and sends it to a speaker 2104. An imaging unit 2105 includes an image sensor described in the first or second embodiment, shoots an image of an object, and outputs image data. In image shooting, an image processing unit 2106 processes the image data shot by the imaging unit 2105, converts the image data into a format suitable for recording, and outputs it. When reproducing a recorded image, the image processing unit 2106 processes the reproduced image and sends it to a display unit 2107. The display unit 2107 includes a liquid crystal display panel of several inches, and displays various kinds of screens in accordance with an instruction from a control unit 2109. A nonvolatile memory 2108 stores data such as information of an address book, data of email, and image data shot by the imaging unit 2105.

The control unit 2109 includes a CPU, memory, and the like, and controls the units of the portable telephone 2100 in accordance with a control program stored in the memory (not shown). An operation unit 2110 includes a power button, number keys, and various operation keys used by the user to input data. A card IF 2111 records/reproduces various kinds of data in/from a memory card 2112. An external IF 2113 transmits data stored in the nonvolatile memory 2108 or the memory card 2112 to an external device, and receives data transmitted from the external device. The external IF 2113 performs communication by a known communication method such as a wired communication method such as USB or wireless communication.

The speech communication function of the portable telephone 2100 will be described next. To call the communication partner, the user inputs the number of the communication partner by operating the number keys of the operation unit 2110 or causes the display unit 2107 to display the address book stored in the nonvolatile memory 2108, selects the communication partner, and instructs a call. When a call is instructed, the control unit 2109 causes the communication unit 2101 to call the communication partner. When the communication partner receives the call, the communication unit 2101 outputs the speech data of the partner to the speech processing unit 2102 and also transmits the speech data of the user to the partner.

To transmit email, the user instructs mail creation using the operation unit 2110. When instructed to create mail, the control unit 2109 displays a screen for mail creation on the display unit 2107. The user inputs a transmission destination address and a text using the operation unit 2110 and instructs transmission. When instructed to transmit the mail, the control unit 2109 sends the address information and the data of the mail text to the communication unit 2101. The communication unit 2101 converts the mail data into a format suitable for communication and sends it to the transmission destination. Upon receiving email, the communication unit 2101 converts the data of the received mail into a format suitable for display and displays it on the display unit 2107.

The shooting function of the portable telephone 2100 will be described next. When the user sets the shooting mode by operating the operation unit 2110 and instructs to shoot a still image or moving image, the imaging unit 2105 shoots still image data or moving image data and sends it to the image processing unit 2106. The image processing unit 2106 processes the shot still image data or moving image data and stores it in the nonvolatile memory 2108. The image processing unit 2106 also sends the shot still image data or moving image data to the card IF 2111. The card IF 2111 stores the still image data or moving image data in the memory card 2112.

The portable telephone 2100 can transmit a file including the thus shot still image or moving image data as an attached file of email. More specifically, when transmitting email, the user selects an image file stored in the nonvolatile memory 2108 or the memory card 2112 and instructs to transmit it as an attached file.

The portable telephone 2100 can also transmit a file including shot still image or moving image data to an external device such as a PC or another telephone via the external IF 2113. By operating the operation unit 2110, the user selects an image file stored in the nonvolatile memory 2108 or the memory card 2112 and instructs to transmit it. The control unit 2109 controls the external IF 2113 so as to read out the selected image file from the nonvolatile memory 2108 or the memory card 2112 and transmit it to an external device.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-081439, filed Apr. 10, 2014 which is hereby incorporated by reference herein in its entirety.

What is claimed is:

1. A stacked-type solid-state image sensor including a first semiconductor layer in which an imaging pixel portion including a plurality of pixels arranged in a matrix and a driving circuit to drive the plurality of pixels included in the imaging pixel portion are arranged, and a second semiconductor layer in which an A/D converter configured to convert an analog signal output from each pixel of the imaging pixel portion into a digital signal and a digital signal processing circuit configured to process the digital signal are arranged, the image sensor comprising:
a clock generating circuit that generates clock signals and supply the clock signals to the driving circuit and the digital signal processing circuit, and
a restriction circuit that restricts the digital signal processing operation of the digital signal processing circuit which is controlled based on the clock signals generated by the clock generating circuit, wherein the restriction circuit restricts the digital signal processing operation of the digital signal processing circuit during a selection period of a vertical signal line of the imaging pixel portion or during the A/D converter converting an analog signal output from each pixel of the imaging pixel portion into a digital signal; and
wherein the restriction circuit restricts the digital signal processing operation of the digital signal processing circuit by applying a masking signal, masking clock edges of the clock signals supplied to the digital signal processing circuit during a predetermined period.

2. The imago sensor according to claim 1 wherein the second semiconductor layer further comprises a logic circuit or memory circuit.

3. The image sensor according to claim 1, wherein the digital signal processing circuit includes a logic circuit using a status holding FF element driven by a reference clock supplied by the restriction circuit.

4. The image sensor according to claim 1, wherein the clock frequency of the digital signal processing circuit is higher than the clock signal for operation control of the drive circuit of the imaging pixel portion.

5. The image sensor according to claim 1, further comprising a signal lines that transfer the analog signal output from each pixel of the imaging pixel portion at the boundary between the first semiconductor layer and the second semiconductor layer.

6. The image sensor according to claim 1, wherein the restriction circuit restricts the digital signal processing operation of the digital signal processing circuit intermittently.

7. An image capturing apparatus comprising: a stacked-type solid-state image sensor including a first semiconductor layer in which an imaging pixel portion including a plurality of pixels arranged in a matrix and a driving circuit to drive the plurality of pixels included in the imaging pixel portion are arranged, and a second semiconductor layer in which an A/D converter configured to convert an analog signal output from each pixel of the imaging pixel portion into a digital signal and a digital signal processing circuit configured to process the digital signal are arranged, the image sensor having:
a clock generating circuit that generates clock signals and supply the clock signals to the driving circuit and the digital signal processing circuit, and
a restriction circuit that restrict the digital signal processing operation of the digital signal processing circuit which is controlled based on the clock signals generated by the clock generating circuit,
wherein the restriction circuit restricts the digital signal processing operation of the digital signal processing circuit during a selection period of a vertical signal line of the imaging pixel portion or during the A/D converter converting an analog signal output from each pixel of the imaging pixel portion into a digital signal; and
wherein the restriction circuit restricts the digital signal processing operation of the digital signal processing circuit by applying a masking signal, masking clock edges of the clock signals supplied to the digital signal processing circuit during a predetermined period.

8. A method of controlling a stacked-type solid-state image sensor including a first semiconductor layer in which an imaging pixel portion including a plurality of pixels arranged in a matrix and a driving circuit to drive the plurality of pixels included in the imaging pixel portion are arranged, and a second semiconductor layer in which an A/D converter configured to convert an analog signal output from each pixel of the imaging pixel portion into a digital signal and a digital signal processing circuit configured to process the digital signal are arranged, the method comprising:
generating clock signals and supply the clock signals to the driving circuit and the digital signal processing circuit, and
restricting the digital signal processing operation of the digital signal processing circuit which is controlled based on the clock signals generated in the generating,
wherein in the restricting, the digital signal processing operation of the digital signal processing circuit is restricted during a selection period of a vertical signal line of the imaging pixel portion or during the A/D converter converting an analog signal output from each pixel of the imaging pixel portion into a digital signal; and
wherein the digital signal processing operation of the digital signal processing circuit is restricted by applying a masking signal, masking clock edges of the clock signal supplied to the digital signal processing circuit during a predetermined period.

9. A stacked-type solid-state image sensor including a first semiconductor layer in which an imaging pixel portion including a plurality of pixels arranged in a matrix is arranged, and a second semiconductor layer in which an A/D converter configured to convert an analog signal output from each pixel of the imaging pixel portion into a digital signal and a digital signal processor configured to process the digital signal are arranged, the image sensor comprising:

a status generating circuit that generates a status signal to restrict the digital signal processing operation of the digital signal processor, and a restriction circuit that restricts the digital signal processing operation of the digital signal processor which is controlled based on the status signals generated by the status generating circuit, wherein the status generating circuit generates the status signal to restrict the digital signal processing operation of the digital signal processor during the A/D converter converting an analog signal output from each pixel of the imaging pixel portion into a digital signal; and wherein the restriction circuit restricts the digital signal processing operation of the digital signal processor by applying a masking signal, masking clock edges of the clock signals supplied to the digital signal processor during a predetermined period.

10. A stacked-type solid-state image sensor including a first semiconductor layer in which an imaging pixel portion including a plurality of pixels arranged in a matrix is arranged, and a second semiconductor layer in which an A/D converter configured to convert an analog signal output from each pixel of the imaging pixel portion into a digital signal and a digital signal processor configured to process the digital signal are arranged, the image sensor comprising:

a restriction circuit that controls the digital signal processor from active state for the digital signal processing to inactive state in which digital signal processing is restricted, wherein the restriction circuit controls the digital signal processor from the active state to the inactive state during the A/D converter converting an analog signal output from each pixel of the imaging pixel portion into a digital signal; and wherein the restriction circuit restricts the digital signal processing operation of the digital signal processor by applying a masking signal, masking clock edges of the clock signals supplied to the digital signal processor during a predetermined period.

* * * * *